United States Patent
Choi et al.

(10) Patent No.: US 8,721,090 B2
(45) Date of Patent: May 13, 2014

(54) PROJECTION SYSTEM HAVING LIGHT SOURCES SELECTIVELY DRIVEN IN RESPONSE TO AN OPERATION MODE

(75) Inventors: Hyunho Choi, Seoul (KR); Eunsung Seo, Seoul (KR); Seungman Jeong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 72 days.

(21) Appl. No.: 13/377,714

(22) PCT Filed: Jun. 10, 2010

(86) PCT No.: PCT/KR2010/003713
§ 371 (c)(1),
(2), (4) Date: Mar. 5, 2012

(87) PCT Pub. No.: WO2010/143891
PCT Pub. Date: Dec. 16, 2010

(65) Prior Publication Data
US 2012/0154766 A1 Jun. 21, 2012

(30) Foreign Application Priority Data
Jun. 11, 2009 (KR) .......... 10-2009-0051820

(51) Int. Cl.
*G03B 21/26* (2006.01)

(52) U.S. Cl.
USPC ............ 353/94; 353/30; 353/31; 353/85; 353/97; 353/98; 362/241; 362/247; 362/297

(58) Field of Classification Search
USPC ............ 353/30, 31, 37, 38, 85, 94, 97, 98; 362/241, 247, 297, 341, 346; 349/5, 349/7–9
See application file for complete search history.

(56) References Cited

U.S. PATENT DOCUMENTS

| | | | |
|---|---|---|---|
| 6,843,591 B1 * | 1/2005 | Peng et al. ............... | 362/560 |
| 7,628,510 B2 * | 12/2009 | Chen et al. .............. | 362/241 |
| 7,918,561 B2 * | 4/2011 | Ikeda et al. ............... | 353/31 |
| 8,322,860 B2 * | 12/2012 | Sato et al. ............... | 353/52 |
| 2007/0103768 A1 | 5/2007 | Blackham | |
| 2008/0074627 A1 * | 3/2008 | Liu ......................... | 353/85 |
| 2008/0174738 A1 | 7/2008 | Takeda | |
| 2008/0316565 A1 | 12/2008 | Huang | |
| 2010/0265473 A1 | 10/2010 | Yamashita et al. | |

FOREIGN PATENT DOCUMENTS

| | | |
|---|---|---|
| KR | 10-1999-0047450 A | 7/1999 |
| KR | 10-2008-0000395 A | 1/2008 |
| WO | WO-2009/069659 A1 | 6/2009 |

OTHER PUBLICATIONS

International Search Report in International Application No. PCT/KR2010/003713, filed Jun. 10, 2010.
Supplementary European Search Report dated Oct. 9, 2012 in European Application No. 10786374.8, filed Jun. 10, 2010.

* cited by examiner

*Primary Examiner* — Sultan Chowdhury
(74) *Attorney, Agent, or Firm* — Saliwanchik, Lloyd & Eisenschenk

(57) ABSTRACT

A projection system is characterized by: a first light source unit and a second light source unit selectively driven in response to operation mode; a light transmitting unit transmitting light emitted from the first light source unit or the second light source unit in the form of surface light; an image generator generating an image in response to an image signal using the light transmitted from the light transmitting unit; and a projection lens system projecting the image by enlarging the image generated by the image generator and projecting the enlarged image.

17 Claims, 6 Drawing Sheets

PROJECTION SYSTEM HAVING LIGHT SOURCES SELECTIVELY DRIVEN IN RESPONSE TO AN OPERATION MODE

CROSS-REFERENCE TO RELATED APPLICATION

This application is the U.S. national stage application of International Patent Application No. PCT/KR2010/003713, filed Jun. 10, 2010, which claims priority to Korean Application No. 10-2009-0051820, filed Jun. 11, 2009, the disclosures of each of which are incorporated herein by reference in their entirety.

TECHNICAL FIELD

The present invention relates to a projection system.

BACKGROUND ART

A projection system is a device capable of presenting still and/or motion video signals from a light source of a light emitting device to one or more viewers by projecting the signals on a front or a rear surface of a screen.

The projection system may be categorized into four types based on operation methods, that is, a CRT (cathode ray tube) method, a DMD (digital micro-mirror device: a trademark of Texas Instruments) method, a reflective liquid crystal panel method, and a transmissive liquid crystal panel method. The LED (light emitting device) is on the increase as a light source for the projection system because of its small physical size, low-power consumption, long lifetime and availability of three primary colors.

The projection system is recently miniaturized for portability. However, the portable projection system has a disadvantage of limited time of use due to reliance on battery for power supply.

DISCLOSURE OF INVENTION

Technical Problem

In some exemplary embodiments of the present invention, a projection system is provided having an adequate power consumption and brightness for a case where an external power is sufficiently supplied and a case where power is supplied only from a battery.

In some exemplary embodiments of the present invention, a projection system is provided having a long driving time even in a case where power is supplied only from a battery.

Solution to Problem

In some exemplary embodiments of the present invention, a projection system may be provided, the system characterized by: a first light source unit and a second light source unit selectively driven in response to operation mode; a light transmitting unit transmitting light emitted from the first light source unit or the second light source unit in the form of surface light; an image generator generating an image in response to an image signal using the light transmitted from the light transmitting unit; and a projection lens system projecting the image by enlarging the image generated by the image generator and projecting the enlarged image.

Advantageous Effects of Invention

There is an advantage in the projection system according to the present invention in that the projection system can provide an adequate power consumption and brightness for a case where an external power is sufficiently supplied and a case where power is supplied only from a battery.

Another advantage is that the projection system has a long driving time even in a case where power is supplied only from a battery.

MODE FOR THE INVENTION

Preferred embodiments of the present invention will now be described in detail with reference to the annexed drawings.

<First Exemplary Embodiment>

Figure 1:
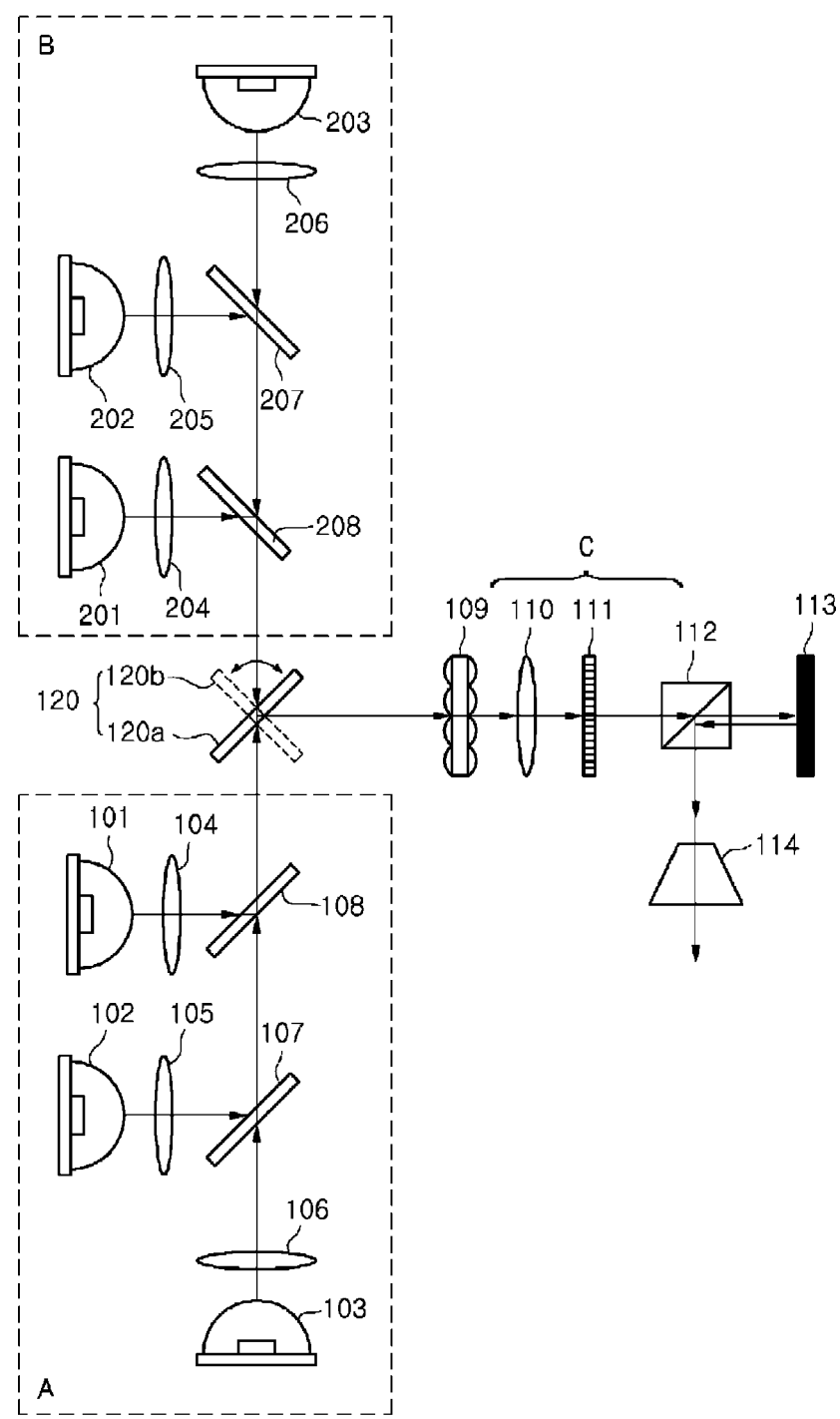
FIG. 1 is a schematic view illustrating a projection system according to a first exemplary embodiment of the present invention.

FIG. 1 is a schematic view illustrating a projection system according to a first exemplary embodiment of the present invention. Referring to FIG. 1, a projection system according to the first exemplary embodiment of the present invention may include a first light source unit (A) and a second light source unit (B) selectively driven in response to operation mode and functioning as light sources of the projection system, a mirror (120) reflecting light incident from the first light source unit (A) or the second light source unit (B), a fly eye lens (109) uniformly applying brightness of the light on an entire area of an image, a relay lens (110) focusing the light, a polarization conversion unit (111) converting a polarization direction of the light, a polarization beam splitter (112. PBS) transmitting P polarization and reflecting S polarization, a liquid crystal panel (113) polarizably-converting the incident light and selectively reflecting the light in response to the inputted image signal, and a projection lens system (114) enlarging the light and projecting the light on a screen.

First, the first light source unit (A) and the second light source unit (B) will be described in detail.

The first light source unit (A) may include a first light emitting device (101) emitting red light, a second light emitting device (102) emitting green light, a third light emitting device (103) emitting blue light, first, second and third collimating lenses (104, 105, 106) converging light emitted by the first, second and third light emitting devices (101, 102, 103), and first and second dichroic minors (107, 108) matching light paths of three colors by selectively reflecting or transmitting the three colors.

The second light source unit (B) may include a fourth light emitting device (201) emitting red light, a fifth light emitting device (202) emitting green light, a sixth light emitting device (203) emitting blue light, fourth, fifth and sixth collimating lenses (204, 205, 206) focusing light emitted by the fourth, fifth and sixth light emitting devices (201, 202, 203), and third and fourth dichroic mirrors (107, 108) matching light paths of three colors by selectively reflecting or transmitting the three colors.

The first light source unit (A) and the second light source unit (B) are selectively driven in response to operation mode, where the operation mode may include an adapter mode and a battery mode. That is, the first light source unit (A) may be operated by the adapter mode while the second light source unit (B) may be operated by the battery mode.

The adapter mode and the battery mode may be selected by a user, or may be automatically selected in response to whether the projection system is connected to an external power source. However, the selection is not limited thereto.

The second light source unit (B) may not be operated while the first light source unit (A) is selected to operate, and the first light source unit (A) may not be operated while the second light source unit (B) is selected to operate.

The first, second and third light emitting devices (101, 102, 103) of the first light source unit (A) operated under the adapter mode may differ in terms of chip size, brightness, power consumption from the fourth, fifth and sixth light emitting devices (201, 202, 203) of the second light source unit (B) operated under the battery mode.

For example, the first, second and third light emitting devices (101, 102, 103) of the first light source unit (A) may have a chip surface of approximately 1.5 $mm^2$ to 4 $mm^2$, while the fourth, fifth and sixth light emitting devices (201, 202, 203) of the second light source unit (B) may have a chip surface of approximately 1 $mm^2$. As a result, the power consumption of the first, second and third light emitting devices (101, 102, 103) of the first light source unit (A) may be greater than that of the fourth, fifth and sixth light emitting devices (201, 202, 203) of the second light source unit (B).

Furthermore, the brightness of the first, second and third light emitting devices (101, 102, 103) of the first light source unit (A) may be approximately 30 lumen (Lm) to 60 lumen (Lm), while the fourth, fifth and sixth light emitting devices (201, 202, 203) of the second light source unit (B) may be 5 lumen to 15 lumen.

The reason of the projection system including the first light source unit (A) and the second light source unit (B), each having different chip area, brightness and power consumption is to drive the projection system more effectively in a case the projection system is operated by battery only and in a case the projection system is operated by external power source.

To be more specific, in a case the projection system is operated by a battery only, the projection system is operated only by power stored in the battery, such that operation time of the projection system becomes shorter in a case a light emitting device having larger chip size, brighter luminance and greater power consumption.

Meanwhile, there is no fear of shortening the operation time of the projection system in a case the projection system is powered by an external power source even if a light emitting device having larger chip size, brighter luminance and greater power consumption is employed.

Therefore, it would be advisable to include the first light source unit (A) and the second light source unit (B) operated under the battery mode and the adapter mode for more efficiently operating the projection system.

That is, the fourth, fifth and sixth light emitting devices (201, 202, 203) under the battery mode (B) having a low power consumption are operated to make fully up the time operated only by the battery even if the brightness is lower. Furthermore, the operation of the first, second and third light emitting devices (101, 102, 103) under the adapter mode having a sufficient brightness can realize a good quality of images even if the power consumption is greater.

Under the adapter mode, the first light source unit (A) is operated by a first power, and under the battery mode, the second light source unit (B) is driven by a second power having a lower power than the first power.

Under the battery mode (B) the brightness and power consumption of the fourth, fifth and sixth light emitting devices (201, 202, 203) are in reverse proportion to the driving time of the projection system, such that the brightness, chip size and power consumption of the fourth, fifth and sixth light emitting devices (201, 202, 203) may be adequately selected based on use and design of the projection system.

A sufficient external power is supplied to the first, second and third light emitting devices (101, 102, 103) under the adapter mode (A) to have no limit of power consumption, such that a desired brightness may be adequately selected even if the power consumption is greater.

In the present exemplary embodiment, although the light emitting devices (101, 102, 103, 201, 202, 203) are described to emit red, green and blue light, the configuration is not limited thereto. Rather, the light emitting devices may be formed by combination of light emitting devices emitting various different colors of light based on design of the projection system or required embodiment of images.

Meanwhile, unlike the present exemplary embodiment, the projection system may not include the first light source unit (A) and the second light source unit (B), but may include a single light emitting unit only to differentiate a current amount flowing in the light emitting devices included in the light source unit according to the battery mode and the adapter mode and to adequately adjust the brightness and the power consumption in response to circumstances.

However, it should be apparent that the embodiment of a single light source unit (that is, a current amount flowing in the single light emitting unit is differentially adjusted by a first current and a second current smaller than the first current according to adapter mode and the battery mode) is inferior in performance and efficiency to that of two light source units (A, B).

To be more specific, in a case the light emitting device used by the single light source unit is replaced by the first, second and third light emitting devices (101, 102, 103) having a larger chip size and a brighter luminance, the driving by the first current is not different in performance and efficiency from the embodiment of adapter mode, but driving by the second current is inferior in performance and efficiency to the battery mode due to Etendue efficiency degradation caused by a larger chip size of the light emitting device.

Furthermore, in a case the light emitting device used by the single light source unit is replaced by the fourth, fifth and sixth light emitting devices (201, 202, 203) having a smaller chip size and a dimmer luminance, the driving by the second current is not different in performance and efficiency from the embodiment of battery mode, but driving by the first current is inferior in performance and light efficiency to the adapter mode due to limit in chip size and brightness of the light emitting device.

Now, configuration and operation of the projection system according to a first exemplary embodiment of the present invention will be described in detail.

The first light source unit (A) and the second light source unit (B) are driven if one of the adapter mode or the battery mode is chosen. As described above, the adapter mode and the battery mode may be chosen by a user or automatically chosen by whether the projection system is connected to an external power source. However, the present embodiment is not limited thereto.

In a case the first light source unit (A) is selected, the first, second and third light emitting devices (101, 102, 103) are driven to emit red, green and blue respectively. The light emitted by the first, second and third light emitting devices (101, 102, 103) is incident on first, second and third collimating lenses (104, 105, 106). The first, second and third collimating lenses (104, 105, 106) focus the light incident from the first, second and third light emitting devices (101, 102, 103). That is, the first, second and third collimating lenses (104, 105, 106) focus in such a manner that the light is not exposed to outside and used by the projection system.

The first and second dichroic mirrors (107, 108) selectively transmit or reflect the tri colors of red, green and blue respectively emitted from the first, second and third light emitting devices (101, 102, 103) based on wavelength to thereby match each advancing path of the tricolors.

That is, the first dichroic mirror (107) transmits the blue light emitted from the third light emitting device (103), and the green light emitted from the second light emitting device (102) is reflected to be incident on the second dichroic mirror (108).

The second dichroic mirror (108) transmits the red light emitted from the first light emitting device (101), and the blue and green light incident from the first dichroic mirror (107) are reflected to resultantly match the advancing path of the tricolors. The tricolors whose advancing paths are matched are incident on the mirror (120).

In a case the second light source unit (B) is selected, operation of the second light source unit (B) corresponds to that of the first light source unit (A), such that description thereto is omitted.

The minor (120) reflects the light incident from the first light source unit (A) or the second light source unit (B) and provides the light to the fly eye lens (109). The minor (120) functions as a light source selector for providing to the fly eye lens (109) the light of the first light source unit (A) or the second light source unit (B) in response to the operation mode.

The minor (120) rotates to selectively have a first angle (120a) or a second angle (120b). That is, in a case the adapter mode is selected to drive the first light source unit (A), the minor (120) comes to have the first angle (120a), whereby the light incident from the first light source unit (A) is incident on the fly eye lens (109). Furthermore, in a case the battery mode is selected to drive the second light source unit (B), the mirror comes to have the second angle (120b), whereby the light incident from the second light source unit (B) is incident on the fly eye lens (109).

The minor (120) is controlled to rotate at the first angle (120a) or the second angle (120b) regardless of whether the adapter mode is selected or the battery mode is chosen.

The fly eye lens (109) uniformly applies the light (surface light) incident from the first light source unit (A) and the second light source unit (B). That is, the image to be projected from a screen is to have the same brightness on the same planar surface.

The relay lens (110) prevents the light incident from the fly eye lens (109) from being diffused to converge the light.

The polarization conversion unit (111) functions to convert a second polarization among the light incident from the relay lens (110) to a first polarization and outputs the first polarization.

In the following exemplary embodiment, the first polarization is disclosed as a P (primary) polarization, while the second polarization is disclosed as an S (secondary) polarization. However, the first polarization may be S polarization and the second polarization may be P polarization according to design of the projection system, which is known to skilled in the art.

The polarization conversion unit (111) may be a P polarizer that transmits the P polarization only but there is no limitation thereto.

The PBS (112. polarized beam splitter) transmits P polarization and reflects S polarization out of light incident from the polarization conversion unit (111). The P polarization that has transmitted the PBS 112 is incident on the liquid crystal panel (113).

The fly eye lens (109), the relay lens (110), the polarization conversion unit (111) and the PBS (112) are included in a light transmitting unit (C) and the light transmitting unit (C) uniformly applies the light emitted from the first light source unit (A) or the second light source unit (B) and transmits the light to the liquid crystal panel (113).

The liquid crystal panel serves as an image generator that generates an image in response to an image signal. Meanwhile, the image generating unit may include a digital micromirror device (DMD) instead of the liquid crystal panel (113) but the present exemplary embodiment is not limited thereto.

The liquid crystal panel (113) polarizes and converts the light that has penetrated the PBS (112) and selectively reflects the light in response to the pre-inputted image signal.

Although the liquid crystal panel (113) of the present exemplary embodiment has been focused on description of a reflective liquid crystal panel, e.g., LCoS (liquid crystal on Silicon), the liquid crystal panel may be a transmissive liquid crystal panel. The present exemplary embodiment is not limited thereto.

To be more specific, the liquid crystal panel (113) polarizes and converts the P polarization that has penetrated the PBS (112) to S polarization, and selectively reflects by ON/OFF operation in response to the pre-inputted image signal. As a result, the light reflected and emitted from the liquid crystal panel (113) selectively becomes a reflected S polarization.

The S polarization selectively reflected from the liquid crystal panel (113) is again incident on the PBS (112). The PBS (112) reflects the S polarization, and the S polarization selectively reflected by the liquid crystal panel (113) is reflected by the PBS (112) is reflected by the PBS (112) to be incident on the projection lens system (114).

The light incident on the projection lens system (114) is enlarged by the projection lens system (114) to be projected on the screen.

As noted above, the projection system according to the first exemplary embodiment of the present invention is operated in such a fashion that the adapter mode or a battery mode is selected in response to a situation of whether power is supplied by an external power source to drive the first light source unit (A) or the second light source unit (B), whereby an efficient image can be embodied to have brightness and driving time catering to the situation.

<Second Exemplary Embodiment>

Figure 2:
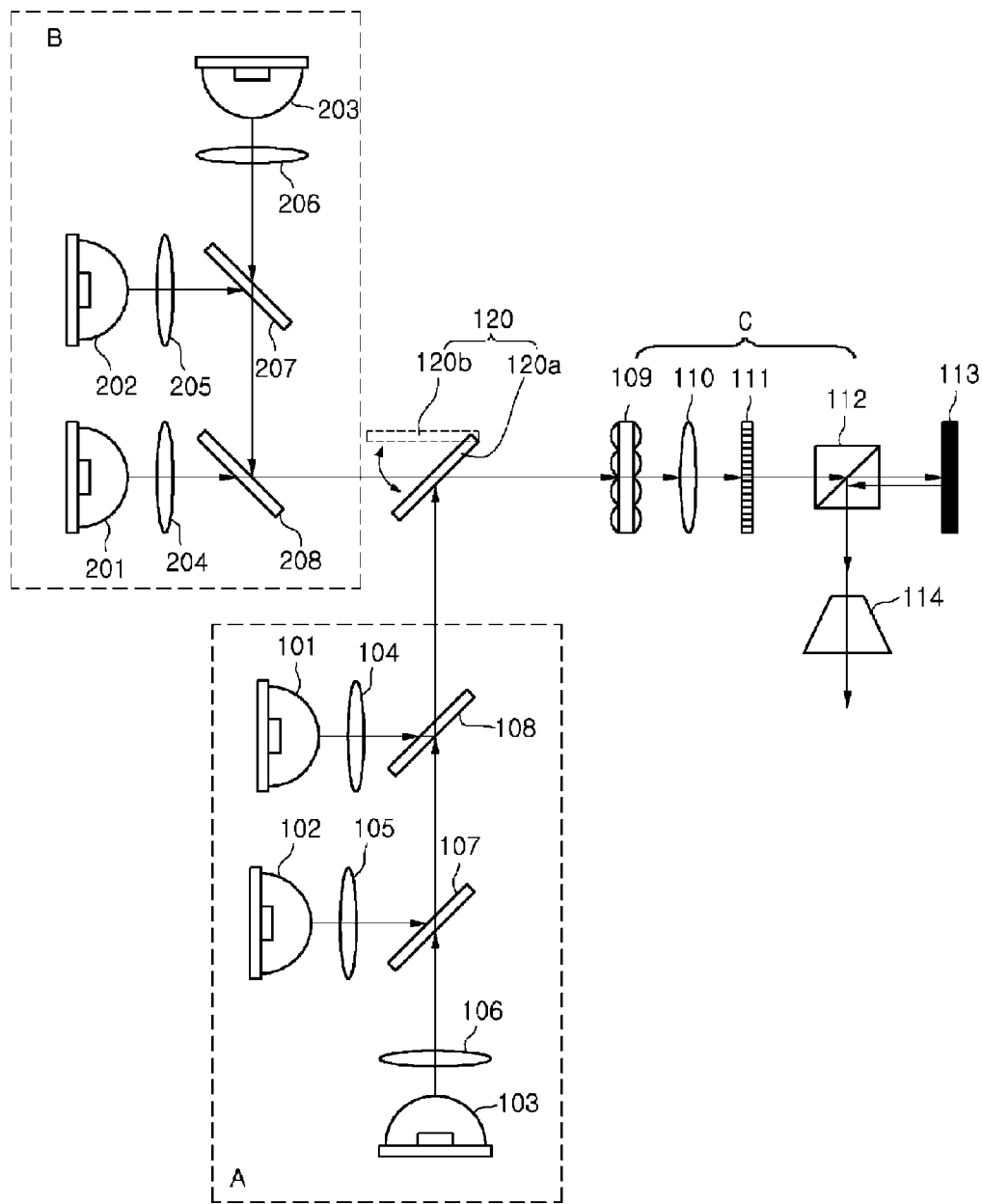
FIG. 2 is a schematic view illustrating a projection system according to a second exemplary embodiment of the present invention.

FIG. 2 is a schematic view illustrating a projection system according to a second exemplary embodiment of the present invention, where any overlapping description as that of the first exemplary embodiment will be omitted.

Referring to FIG. 2, a projection system according to the second exemplary embodiment of the present invention may include a first light source unit (A) and a second light source unit (B) selectively driven in response to operation mode and functioning as light sources of the projection system, a foldable or unfoldable mirror (120) reflecting light incident from the first light source unit (A) or the second light source unit (B), a fly eye lens (109) uniformly applying brightness of the light on an entire area of an image, a relay lens (110) focusing the light, a polarization conversion unit (111) converting a polarization direction of the light, a polarization beam splitter (112. PBS) transmitting P polarization and reflecting S polarization, a liquid crystal panel (113) polarizably-converting the incident light and selectively reflecting the light in response to the inputted image signal, and a projection lens system (114) enlarging the light and projecting the light on a screen.

The configuration, effect and operation of the first light source unit (A) and the second light source unit (B) are the same as those of the first exemplary embodiment, such that description thereon will be omitted.

In a case one of the adapter mode or the battery mode is selected, the first light source unit (A) or the second light source unit (B) is driven. The adapter mode or the battery mode may be selected by a user, or may be automatically selected by whether the projection system is connected to an external power source. However, the present exemplary embodiment is not limited thereto.

The minor (120) is rotated in a case the adapter mode is selected and in a case the battery mode is selected relative to the projection system to have a first angle (120a) or a second angle (120b) respectively. As a result, the mirror (120) functions as a light source selecting unit that provides to the fly eye lens (109) the light from the first light source unit (A) or the second light source unit (B) in response to the operation mode.

To be more specific, in a case the battery mode is selected to drive the second light source unit (B), the mirror (120) comes to operate at a second angle (120b), whereby the light incident from the second light source unit (B) is not reflected by the mirror (120) to be directly incident on the fly eye lens (109). Furthermore, in a case the battery mode is selected or the adapter mode is selected, the mirror (120) may be also controlled to rotate at the first angle (120a) or the second angle (120b).

Thereafter, the light emitted from the first light source unit (A) or the second light source unit (B) is embodied as an image on a screen through the fly eye lens (109), the relay lens (110), the polarization conversion unit (111), the PBS (112), the liquid crystal panel (113) and the projection lens system (114).

The fly eye lens (109), the relay lens (110), the polarization conversion unit (111) and the PBS (112) may function as a light transmitting unit (C), while the liquid crystal panel (113) may serve as an image generator.

As noted above, the projection system according to the second exemplary embodiment of the present invention is operated in such a fashion that the adapter mode or a battery mode is selected in response to a situation of whether power is supplied by an external power source to drive the first light source unit (A) or the second light source unit (B), whereby an efficient image can be embodied to have brightness and driving time catering to the situation.

<Third Exemplary Embodiment>

Figure 3:
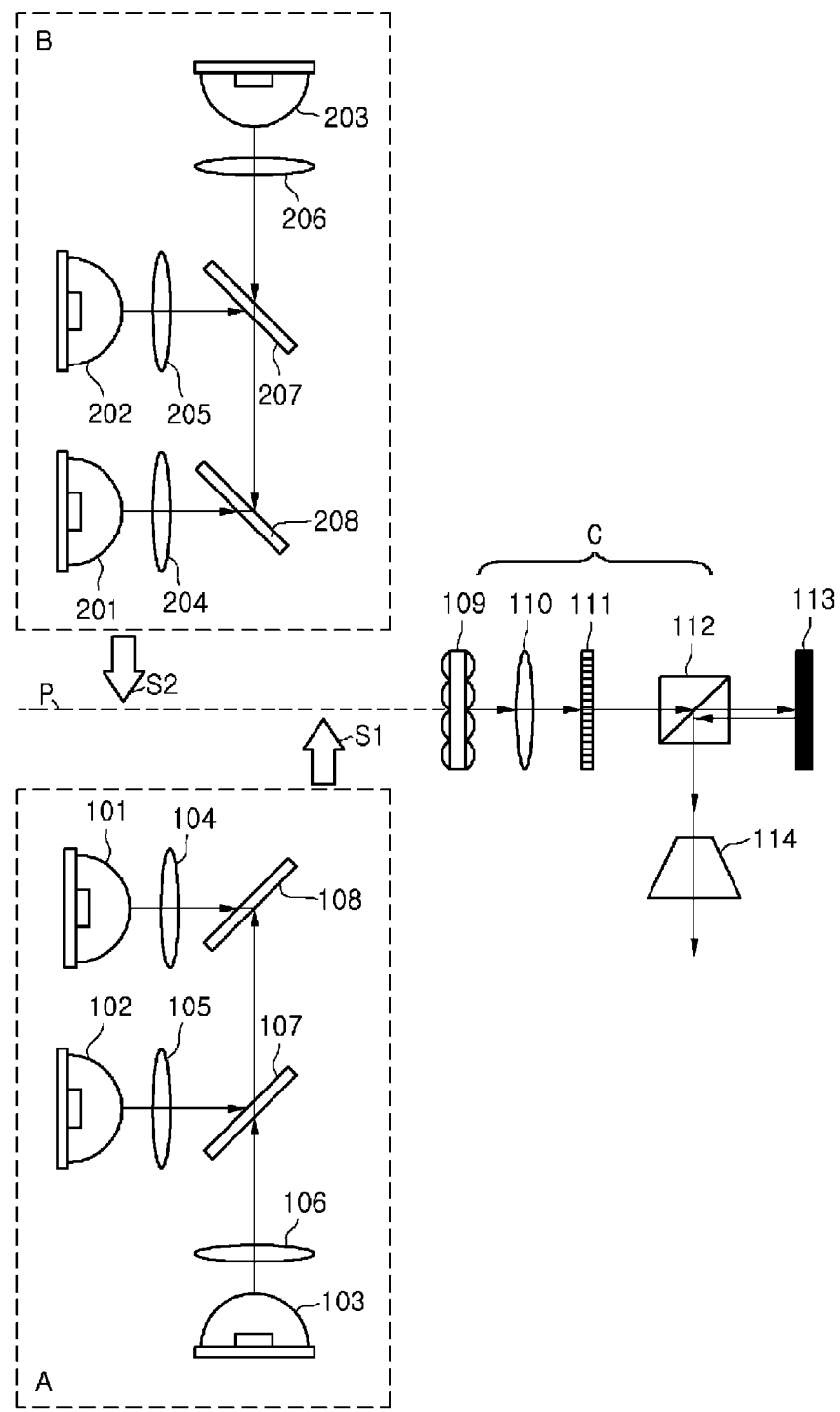
FIG. 3 is a schematic view illustrating a projection system according to a third exemplary embodiment of the present invention.

FIG. 3 is a schematic view illustrating a projection system according to a third exemplary embodiment of the present invention, where any overlapping description as that of the first exemplary embodiment will be omitted.

Referring to FIG. 3, a projection system according to the third exemplary embodiment of the present invention may include a first light source unit (A) and a second light source unit (B) selectively driven in response to operation mode and functioning as light sources of the projection system, a fly eye lens (109) uniformly applying brightness of the light on an entire area of an image, a relay lens (110) focusing the light, a polarization conversion unit (111) converting a polarization direction of the light, a polarization beam splitter (112. PBS) transmitting P polarization and reflecting S polarization, a liquid crystal panel (113) polarizably-converting the incident light and selectively reflecting the light in response to the inputted image signal, and a projection lens system (114) enlarging the light and projecting the light on a screen.

The configuration, effect and operation of the first light source unit (A) and the second light source unit (B) are the same as those of the first exemplary embodiment, such that description thereon will be omitted.

In a case one of the adapter mode or the battery mode is selected, the first light source unit (A) or the second light source unit (B) is driven. The adapter mode or the battery mode may be selected by a user, or may be automatically selected by whether the projection system is connected to an external power source. However, the present exemplary embodiment is not limited thereto.

Meanwhile, in a case any one of the adapter mode or the battery mode is selected, the first light source unit (A) and/or the second light source unit (B) is moved as the emitted light is incident on the fly eye lens (109) along a light path axle (P).

To be more specific, in a case the adapter mode is selected, the first light source unit (A) moves to a first direction (S1) to allow the emitted light of the first light source unit (A) to be incident on the fly eye lens (109) along the light path axle (P). That is, the first light source unit (A) is moved so that the light transmitted or reflected from the second dichroic mirror (108) of the first light source unit (A) can be incident on the fly eye lens (109).

Furthermore, in a case the battery mode is selected, the second light source unit (B) is moved to a second direction (S2) to allow the emitted light of the second light source unit (B) to be incident on the fly eye lens (109) along the light path axle (P). That is, the second light source unit (B) is moved so that the light transmitted or reflected from the second dichroic mirror (208) of the second light source unit (B) can be incident on the fly eye lens (109).

Meanwhile, the first light source unit (A) and the second light source unit (B) may move together to the first direction (S1) or to the second direction (S2). However a detailed moving method is not limited thereto. For example, the first light source unit (A) and the second light source unit (B) may be respectively moved by a stepping motor.

The projection system according to the present invention is so designed as to be controlled together in a case the moving directions (S1, S2) of the first light source unit (A) and the second light source unit (B) are selected by the adapter mode or the battery mode.

Thereafter, the light emitted from the first light source unit (A) or the second light source unit (B) is embodied as an image on a screen through the fly eye lens (109), the relay lens (110), the polarization conversion unit (111), the PBS (112), the liquid crystal panel (113) and the projection lens system (114).

The fly eye lens (109), the relay lens (110), the polarization conversion unit (111) and the PBS (112) may function as a light transmitting unit (C), while the liquid crystal panel (113) may serve as an image generator.

As noted above, the projection system according to the third exemplary embodiment of the present invention is operated in such a fashion that the adapter mode or a battery mode is selected in response to a situation of whether power is supplied by an external power source to selectively drive the first light source unit (A) or the second light source unit (B), whereby an efficient image can be realized to have brightness and driving time catering to the situation.

<Fourth Exemplary Embodiment>

Figure 4:
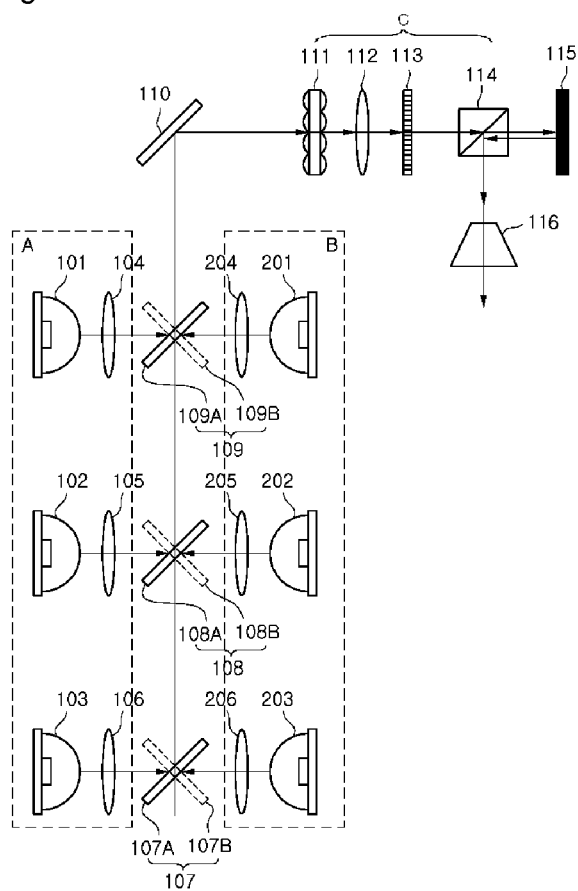
FIG. 4 is a schematic view illustrating a projection system according to a fourth exemplary embodiment of the present invention.

FIG. 4 is a schematic view illustrating a projection system according to a fourth exemplary embodiment of the present invention, where any overlapping description as that of the first exemplary embodiment will be omitted.

Referring to FIG. 4, a projection system according to the fourth exemplary embodiment of the present invention may include a first light source unit (A) and a second light source unit (B) selectively driven in response to operation mode and functioning as light sources of the projection system, a first minor (107) and first and second dichroic mirrors (108, 109) reflecting or transmitting light incident from the first light source unit (A) or the second light source unit (B) to match a light path of light incident from the first light source unit (A) or the second light source unit (B), a fly eye lens (111) uniformly applying brightness of the light incident from the second dichroic mirror (109) on an entire area of an image, a relay lens (112) focusing the light, a polarization conversion unit (113) converting a polarization direction of the light, a polarization beam splitter (114. PBS) transmitting P polarization and reflecting S polarization, a liquid crystal panel (115) polarizably-converting the incident light and selectively reflecting the light in response to the inputted image signal, and a projection lens system (116) enlarging the light and projecting the light on a screen.

The first light source unit (A) may include a first light emitting device (101) emitting red light, a second light emitting device (102) emitting green light, a third light emitting device (103) emitting blue light, first, second and third collimating lenses (104, 105, 106) focusing the tri-light emitted by the first, second and third light emitting devices (101, 102, 103).

The second light source unit (B) may include a fourth light emitting device (201) emitting red light, a fifth light emitting device (202) emitting green light, a sixth light emitting device (203) emitting blue light, fourth, fifth and sixth collimating lenses (204, 205, 206) focusing the tri-light emitted by the fourth, fifth and sixth light emitting devices (201, 202, 203), and third and fourth dichroic mirrors (107, 108).

In a case the adapter mode is selected, the first light source unit (A) is driven and the light emitted from the first light source unit (A) may be incident on the first mirror (107) and first and second dichroic lenses (108, 109). At this time, the first minor (107) may have a first angle (107A) and the first and second dichroic lenses (108, 109) may respectively have first and second angle (108A, 109A).

As a result, the blue light emitted from the third light emitting device (103) is reflected by the first mirror (107), and the red and green light respectively emitted from the first and second light emitting devices (101, 102), and the blue light emitted from the first mirror (107) are selectively transmitted or reflected by the first and second dichroic mirrors (108, 109) to match the light paths of the tri (red, green and blue)-colors, and are incident on the second minor (110).

In a case the battery mode is selected, the second light source unit (B) may be driven, and the light emitted from the second light source unit (B) is incident on the first mirror (107), the first and second dichroic minors (108, 109) respectively. At this time, the first mirror (107) may have a second angle (107B) and the first and second dichroic mirrors (108, 109) may have second angles (108B, 109B).

As a result, the blue light emitted from the sixth light emitting device (203) is reflected by the first mirror (107), and the red and green light respectively emitted from the fourth and fifth light emitting devices (201, 202), and the blue light emitted from the first mirror (107) are selectively transmitted or reflected by the first and second dichroic mirrors (108, 109) to match the light paths of the tri (red, green and blue)-colors, and are incident on the second minor (110).

That is, the first mirror (107) and the first and second dichroic minors (108, 109) may function as light selecting units for allowing the light emitted from the first light source unit (A) or the second light source unit (B) to be provided to the fly eye lens (109) in response to the operation mode.

The angles (107A, 107B) of the first mirror (107) and the angles (108A, 108B, 109A, 109B) of the first and second dichroic minors (108, 109) may be controlled at the same time in a case the adapter mode or the battery mode is selected.

The second mirror (110) may reflect the light incident from the second dichroic mirror (109) to the fly eye lens (111). However, the second mirror (110) may not be included according to design of the projection system.

Thereafter, the light reflected from the second mirror (110) is embodied as an image on a screen through the fly eye lens (109), the relay lens (110), the polarization conversion unit (111), the PBS (112), the liquid crystal panel (113) and the projection lens system (114).

The fly eye lens (109), the relay lens (110), the polarization conversion unit (111) and the PBS (112) may function as a light transmitting unit (C), while the liquid crystal panel (113) may serve as an image generator.

As noted above, the projection system according to the fourth exemplary embodiment of the present invention is operated in such a fashion that the adapter mode or a battery mode is selected in response to a situation of whether power is supplied by an external power source to selectively determine the angles of the first mirror (107) and the first and second dichroic mirrors (108, 109) and the driving of the first light source unit (A) and the second light source unit (B), whereby an efficient image can be realized to have brightness and driving time catering to the situation.

<Fifth Exemplary Embodiment>

Figure 5:
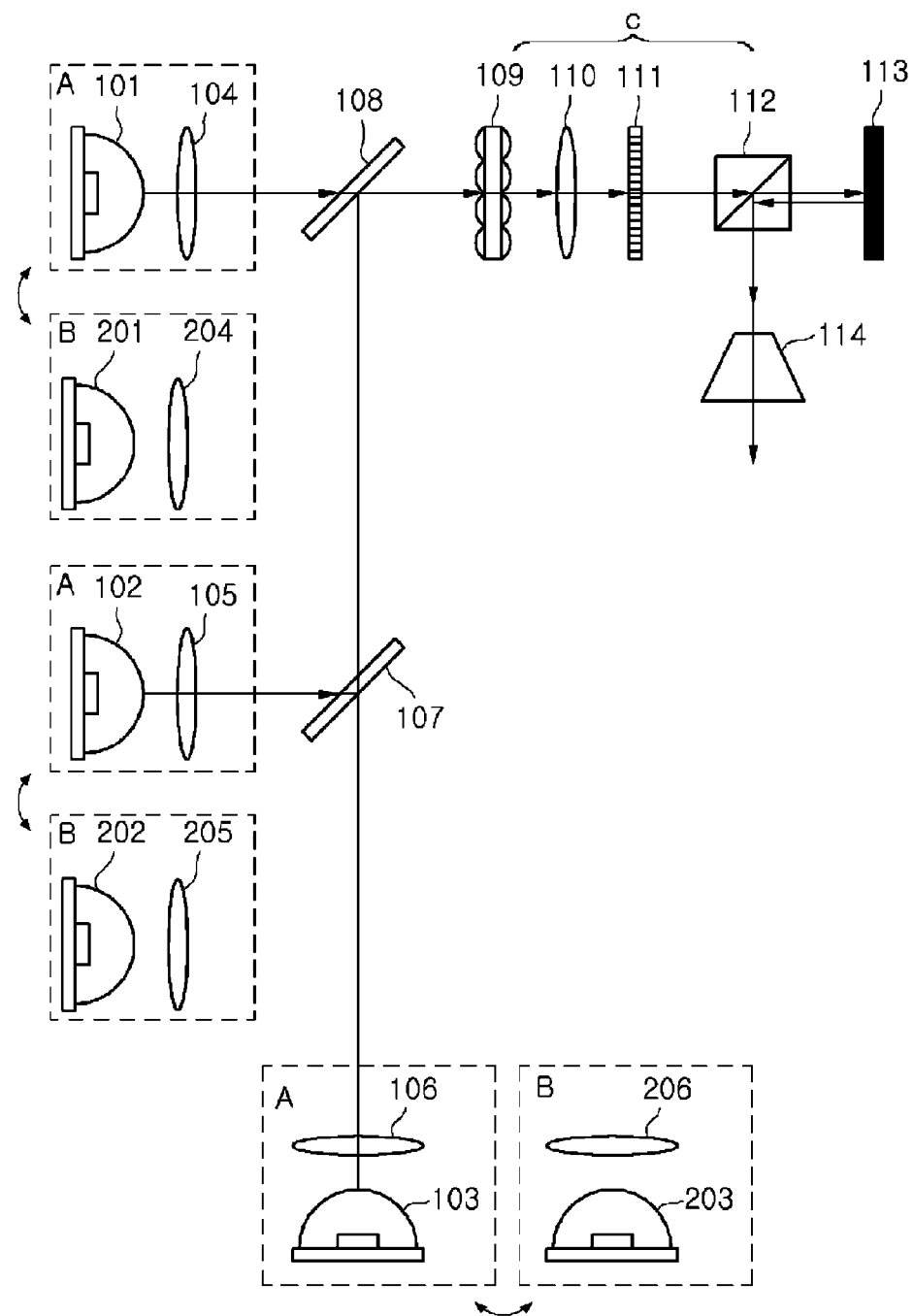
FIG. 5 is a schematic view illustrating a projection system according to a fifth exemplary embodiment of the present invention.

FIG. 5 is a schematic view illustrating a projection system according to a fifth exemplary embodiment of the present invention, where any overlapping description as that of the first exemplary embodiment will be omitted.

Referring to FIG. 5, a projection system according to the fifth exemplary embodiment of the present invention may include a first light source unit (A) and a second light source unit (B) selectively driven in response to operation mode and functioning as light sources of the projection system, first and second dichroic mirrors (107, 108) reflecting or transmitting light incident from the first light source unit (A) or the second light source unit (B) to match a light path of light incident from the first light source unit (A) or the second light source unit (B), a fly eye lens (109) uniformly applying brightness of the light incident from the second dichroic mirror (108) on an entire area of an image, a relay lens (110) focusing the light, a polarization conversion unit (111) converting a polarization direction of the light, a polarization beam splitter (112. PBS) transmitting P polarization and reflecting S polarization, a liquid crystal panel (113) polarizably-converting the incident light and selectively reflecting the light in response to the inputted image signal, and a projection lens system (114) enlarging the light and projecting the light on a screen.

The first light source unit (A) may include a first light emitting device (101) emitting red light, a second light emitting device (102) emitting green light, a third light emitting device (103) emitting blue light, first, second and third collimating lenses (104, 105, 106) focusing the tri-light emitted by the first, second and third light emitting devices (101, 102, 103).

The second light source unit (B) may include a fourth light emitting device (201) emitting red light, a fifth light emitting device (202) emitting green light, a sixth light emitting device (203) emitting blue light, fourth, fifth and sixth collimating lenses (204, 205, 206) focusing the tri-light emitted by the fourth, fifth and sixth light emitting devices (201, 202, 203).

The first light source unit (A) and a second light source unit (B) may be selectively driven in response to operation mode, where the driving mode includes an adapter mode and a battery mode. That is, the first light source unit (A) may be driven by the adapter mode and the second light source unit (B) may be driven by the battery mode. The adapter mode and the battery mode may be selected by a user or may be automatically selected in response to a situation of whether the projection system is connected to an external power source. However, the selection is not limited thereto.

In a case the adapter mode is selected, the first light source unit (A) is so moved as to allow the emitted light to be incident on the first and second dichroic mirrors (107, 108). That is, in a case the adapter mode is selected, the first light source unit (A) is so moved as to allow the light emitted from the first light emitting device (101) to be incident on the second dichroic minor (108), and the light emitted from the second and third light emitting devices (102, 103) to be incident on the first dichroic mirror (107).

Likewise, in a case the battery mode is selected, the second light source unit (B) is so moved as to allow the emitted light to be incident on the first and second dichroic mirrors (107, 108).

Meanwhile, the first light source unit (A) and a second light source unit (B) may move together or move separately. As noted, the first light source unit (A) and a second light source unit (B) may be so designed as to move together in a case the adapter mode is selected or the battery mode is selected. The light incident on the first and second dichroic mirrors (107, 108) is selectively transmitted or reflected to allow the light paths of red, green and blue to be matched and is incident on the fly eye lens (109).

Thereafter, the light incident on fly eye lens (109) is embodied as an image on a screen through the relay lens (110), the polarization conversion unit (111), the PBS (112), the liquid crystal panel (113) and the projection lens system (114).

The fly eye lens (109), the relay lens (110), the polarization conversion unit (111) and the PBS (112) may function as a light transmitting unit (C), while the liquid crystal panel (113) may serve as an image generator.

As noted above, the projection system according to the fifth exemplary embodiment of the present invention is operated in such a manner that the adapter mode or a battery mode is selected in response to a situation of whether power is supplied by an external power source to allow the first light source unit (A) and the second light source unit (B) to move and be driven, whereby an efficient image can be realized to have brightness and driving time catering to the situation.

<Sixth Exemplary Embodiment>

Figure 6:
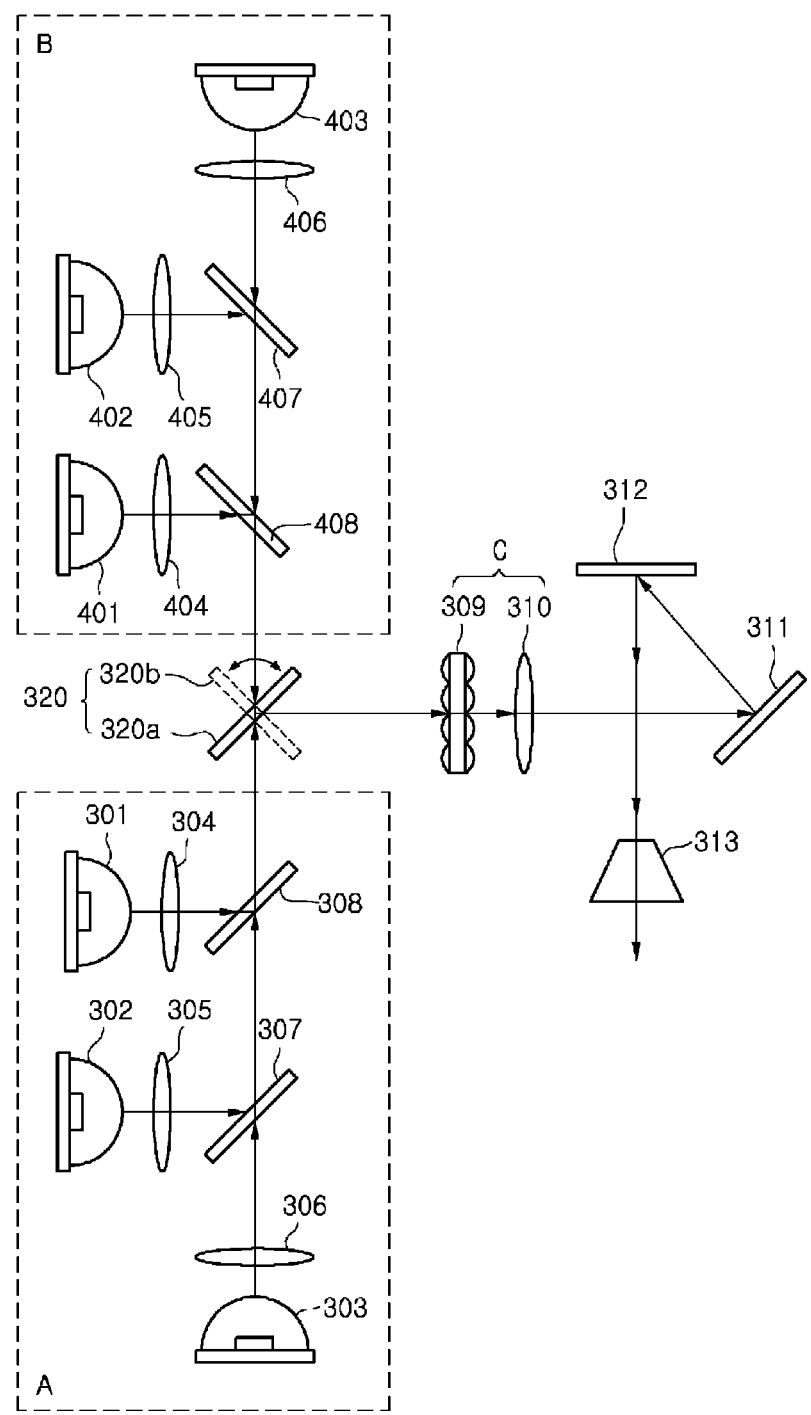
FIG. 6 is a schematic view illustrating a projection system according to a sixth exemplary embodiment of the present invention.

FIG. 6 is a schematic view illustrating a projection system according to a sixth exemplary embodiment of the present invention, where any overlapping description as that of the first exemplary embodiment will be omitted.

Referring to FIG. 6, a projection system according to the sixth exemplary embodiment of the present invention may include a first light source unit (A) and a second light source unit (B) selectively driven in response to operation mode and functioning as light sources of the projection system, a first minor (320) reflecting light incident from the first light source unit (A) and a second light source unit (B), a fly eye lens (309) uniformly applying brightness of the light on an entire area of an image, a relay lens (310) focusing the light, a second mirror (311) reflecting the light to a digital micromirror device (312.DMD), the digital micromirror device (312.DMD) selectively reflecting to a projection lens system (313) the incident light in response to ON/OFF signal by adjusting a reflection angle of a microscopic mirror, and the projection lens system (313) enlarging the light and projecting the light on a screen.

The configuration, effect and operation of the first light source unit (A) and the second light source unit (B), the first mirror (320), the fly eye lens (309) and the relay lens (310) are the same as those of the first exemplary embodiment, such that description thereon will be omitted.

The fly eye lens (309) and the relay lens (310) function as a light transmitting unit (C). The light incident on the relay lens (310) is incident on an image generating unit, where the image generating unit may include the second minor (311) and the digital micromirror device (312.DMD). However, the image generating unit may be variably modified as needed.

The second mirror (311) reflects the light incident from the relay lens (310) to the digital micromirror device (312.DMD). The digital micromirror device (312.DMD) adjusts a reflection angle of a microscopic mirror in response to ON/OFF signal to selectively reflect to the projection lens system (313).

To be more specific, a DMD chip has on its surface several hundred thousand microscopic mirrors arranged in a rectangular array which correspond to the pixels in the image to be displayed. The mirrors can be individually rotated to an ON or OFF state. That is, a reflection angle of the microsfic minor is adjusted in response to ON/OFF signal inputted to each pixel, and light is selectively reflected according to the reflection angle. The light is reflected into the projection lens system (313) in response to the reflection angle.

The light incident on the projection lens system (313) by the DMD (312) is enlarged and projected onto a screen.

As mentioned above, an image is realized using the DMD (312) instead of the liquid crystal panel relative to the image generating unit in the sixth exemplary embodiment, unlike the first exemplary embodiment, and it should be noted that other modifications may be available. Furthermore, the DMD (312) may be applied to the second, third, fourth and fifth exemplary embodiments.

As noted above, the projection system according to the sixth exemplary embodiment is operated in such a manner that the adapter mode or the battery mode is selected accoring to a situation of whether power is supplied from an external power source to drive the first light source unit (A) or the second light source unit (B), whereby an efficient image can be made to have brightness and driving time catering to the situation.

While the present disclosure has been particularly shown and described with reference to exemplary implementations thereof, the general inventive concept is not limited to the above-described implementations. It will be understood by those of ordinary skill in the art that various changes and variations in form and details may be made therein without departing from the spirit and scope of the present invention as defined by the following claims.

INDUSTRIAL APPLICABILITY

The present invention can provide a projection system having an adequate power consumption and brightness according to a case where power is sufficiently supplied by an external power supply source and to a case where power is supplied only by a battery.

The invention claimed is:

1. A projection system, comprising:
a first light source unit and a second light source unit selectively driven in response to an operation mode;
a light transmitting unit configured to transmit light emitted from the first light source unit or the second light source unit in the form of surface light;
an image generator configured to generate an image in response to an image signal using the light transmitted from the light transmitting unit;
a projection lens unit configured to enlarge the image generated by the image generator and project the enlarged image, wherein the operation mode is determined based on whether power is supplied through an adapter (an adapter mode) or from a battery (a battery mode); and
a light source selector configured to allow the light from the first light source unit or the second light source unit to be transmitted to the light transmitter in response to the operation mode,
wherein the light source selector includes a mirror, and wherein the mirror has a first angle when the first light source unit is operated, and has a second angle when the second light source unit is operated, such that the light incident from the first light source unit or the second light source unit is transmitted to the light transmitter.

2. The projection system of claim 1, wherein the first light source unit is operated in the adapter mode and the second light source unit is operated in the battery mode.

3. The projection system of claim 1, wherein the mirror is rotated about a center to have the first angle or the second angle.

4. The projection system of claim 3, wherein the first and second light source units face each other to emit light.

5. The projection system of claim 1, wherein the mirror is rotated at one side to have the first angle or the second angle.

6. The projection system of claim 5, wherein the first and second light source units are alternatively positioned to emit light.

7. A projection system, comprising:
a first light source unit and a second light source unit selectively driven in response to an operation mode;
a light transmitting unit configured to transmit light emitted from the first light source unit or the second light source unit in the form of surface light;
an image generator configured to generate an image in response to an image signal using the light transmitted from the light transmitting unit; and
a projection lens unit configured to enlarge the image generated by the image generator and project the enlarged image, wherein the operation mode is determined based on whether power is supplied through an adapter (an adapter mode) or from a battery (a battery mode),
wherein the first light source unit moves to a first direction when the first light source unit is operated to allow the light incident from the first light source unit to be transmitted to the light transmitter, and the second light source unit moves to a second direction when the second light source unit is operated to allow the light incident from the second light source unit to be transmitted to the light transmitter.

8. The projection system of claim 7, wherein the first light source unit moved to the first direction and the second light source unit moved to the second direction are respectively positioned on a light path axle into which light of the light transmitter is incident.

9. The projection system of claim 1, wherein the first light source unit uses a first power, while the second light source unit uses a second power smaller than the first power.

10. The projection system of claim 2, wherein a chip area of the first light source unit is larger than that of the second light source unit.

11. The projection system of claim 1, wherein the first light source unit includes a first light emitting device, a second light emitting device and a third light emitting device, each emitting red, green and blue, and the second light source unit includes a fourth light emitting device, a fifth light emitting device and a sixth light emitting device, each emitting red, green and blue.

12. A projection system, comprising:
a first light source unit and a second light source unit selectively driven in response to an operation mode;
a light transmitting unit configured to transmit light emitted from the first light source unit or the second light source unit in the form of surface light;
an image generator configured to generate an image in response to an image signal using the light transmitted from the light transmitting unit;
a projection lens unit configured to enlarge the image generated by the image generator and project the enlarged image, wherein the operation mode is determined based on whether power is supplied through an adapter (an adapter mode) or from a battery (a battery mode); and
a light source selector configured to allow the light from the first light source unit or the second light source unit to be transmitted to the light transmitter in response to the operation mode,
wherein the first and second light source units are aligned, and the first and second light source units are selectively moved in response to the operation mode to emit light to the light transmitter through at least one dichroic mirrors.

13. The projection system of claim 1, wherein the light transmitter includes a fly eye lens uniformly applying brightness of the light on an entire area of an image, a relay lens focusing the light, and a mirror reflecting the light to the image generator.

14. The projection system of claim 1, wherein the light transmitter includes a fly eye lens uniformly applying light provided by the first light source unit or the second light source unit, a polarization conversion unit polarizably converting a secondary polarization in the light incident from the fly eye lens to a primary polarization, and a PBS (polarization beam splitter) transmitting the primary polarization in the light incident from the polarization conversion unit but reflecting the light that has not transmitted.

15. The projection system of claim 1, wherein the light transmitter includes a fly eye lens uniformly applying the light provided by the first light source unit or the second light source unit.

16. The projection system of claim 11, wherein the first light source unit or the second light source unit are different in terms of at least one of chip area, brightness and power consumption.

17. The projection system of claim 12, wherein the light source selector includes a mirror and a dichroic mirror, and wherein each of the mirror and the dichroic mirror has a first angle when the first light source unit is operated, and has a second angle when the second light source unit is operated, such that light path of light incident from the first light source unit or the second light source unit can be matched and provided to the light transmitter.

* * * * *